US012189995B2

United States Patent
Agarwal et al.

(10) Patent No.: US 12,189,995 B2
(45) Date of Patent: Jan. 7, 2025

(54) TRANSLATION AND DATA MANAGEMENT IN STORAGE DEVICES

(71) Applicant: WESTERN DIGITAL TECHNOLOGIES, INC., San Jose, CA (US)

(72) Inventors: Dinesh Agarwal, San Jose, CA (US); Rishabh Dubey, San Jose, CA (US); Arun Kannan, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/447,556

(22) Filed: Aug. 10, 2023

(65) Prior Publication Data

US 2024/0231696 A1 Jul. 11, 2024

Related U.S. Application Data

(60) Provisional application No. 63/478,621, filed on Jan. 5, 2023.

(51) Int. Cl.
*G06F 3/06* (2006.01)
(52) U.S. Cl.
CPC .......... *G06F 3/0659* (2013.01); *G06F 3/0679* (2013.01); *G06F 3/0604* (2013.01)
(58) Field of Classification Search
CPC ..... G06F 3/0659; G06F 3/0679; G06F 3/0604
See application file for complete search history.

(56) References Cited

U.S. PATENT DOCUMENTS

| | | | |
|---|---|---|---|
| 8,059,658 B1 * | 11/2011 | Rovner | H04L 45/023 370/395.31 |
| 8,250,333 B2 | 8/2012 | Gorobets et al. | |
| 10,268,584 B2 | 4/2019 | Hahn | |
| 10,359,955 B2 | 7/2019 | Inbar et al. | |
| 11,036,425 B2 | 6/2021 | Lee et al. | |
| 2016/0196210 A1 * | 7/2016 | Noguchi | G06F 12/0811 711/122 |
| 2021/0064548 A1 | 3/2021 | Grosz et al. | |
| 2022/0350532 A1 * | 11/2022 | Porzio | G06F 1/08 |
| 2023/0057083 A1 * | 2/2023 | Rudoff | G06F 12/0811 |

\* cited by examiner

*Primary Examiner* — Prasith Thammavong
(74) *Attorney, Agent, or Firm* — Rutan & Tucker LLP; Hani Z. Sayed; Ravi Mohan (57) ABSTRACT

With ever-increasing capacities and performance demanded in new storage devices, the number of control table data entries are increased to store more updates stemming from the increased number of read and/or write operations. To avoid becoming a bottleneck, devices, such as storage devices, and other similar methods and systems as described herein efficiently manage control table sets to reduce latency. This can be accomplished by designating a specific position for each control table set and storing updates to such control table sets in a designated position. Furthermore, data can be efficiently kept in the volatile memory, such as SRAM, or evicted from the volatile memory to the non-volatile memory, such as NAND. Determinations can occur for when the read/write operations should be performed using volatile memory or non-volatile memory. These determinations can be decided dynamically and based on the storage device state and incoming workload, resulting in lower overall latencies.

20 Claims, 5 Drawing Sheets

TRANSLATION AND DATA MANAGEMENT IN STORAGE DEVICES

PRIORITY

This application claims the benefit of and priority to U.S. Provisional Application No. 63/478,621, filed Jan. 5, 2023, which is incorporated in its entirety herein.

FIELD

The present disclosure relates to storage systems. More particularly, the present disclosure relates to enhancing translation and data management within a storage device.

BACKGROUND

Storage devices are ubiquitous within computing systems. Solid-state storage devices have become increasingly common. These nonvolatile storage devices can communicate and utilize various protocols including non-volatile memory express (NVMe), and peripheral component interconnect express (PCIe) to reduce processing overhead and increase efficiency.

Storage devices receive and process large numbers of requests from host-computing devices. The logical addresses requested by the host-computing device most often do not equate directly to the physical location of the data within the memory array of the storage device. Hence, most storage devices utilize logical to physical mappings, or control tables, to write and retrieve data. These mappings can be grouped together into control table sets and stored as fixed sizes of data to be accessed when required.

Data stored in storage devices, such as NAND array storage, is susceptible to read, program, and erase operations. When a data is programmed the logical address of the data has to be stored to enable reading of the data later. This logical address of any data changes with different operation and will keep updating with internal relocation trigger by the storage device for operations such as garbage collection or wear-leveling or re-writing from host. Keeping this mapping for each unit of data written requires a huge amount of space. Further, this mapping has to be retained throughout the life of the device and should not be lost with power cycle. Thus, as data is moved around, added, or deleted from the storage device, the control table sets must also be updated.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

With the ever-increasing capacities of storage devices and the required random performance for the latest generation of storage devices, the number of control table data entries needs to be increased to be able to store more updates occurred as a result of spike in number of read and/or write operations. As a direct result of such a spike in read and/or write operations, performing the search operation has become increasingly time-consuming. To tackle this issue, various embodiments of the disclosure designate a specific position for each control table set and store updates to such control table set in the designated position.

With the multiple layers of read/write operations available, it becomes necessary to decide the operations which result into lower latencies for the incoming commands and also take less processing time which is also important for the overall throughput of a storage device. Thus, in several embodiments, methods for data management are disclosed by determining the data to be kept in the volatile memory, such as SRAM, and determining the data to be evicted from the volatile memory to the non-volatile memory, such as NAND. Further, various embodiments of the disclosure are directed on determining when the read/write operations should be performed using the volatile memory, and when it is preferred from the non-volatile memory. Such determinations can be decided dynamically and based on the storage device state and incoming workload, so that the future operations result into overall low latencies.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
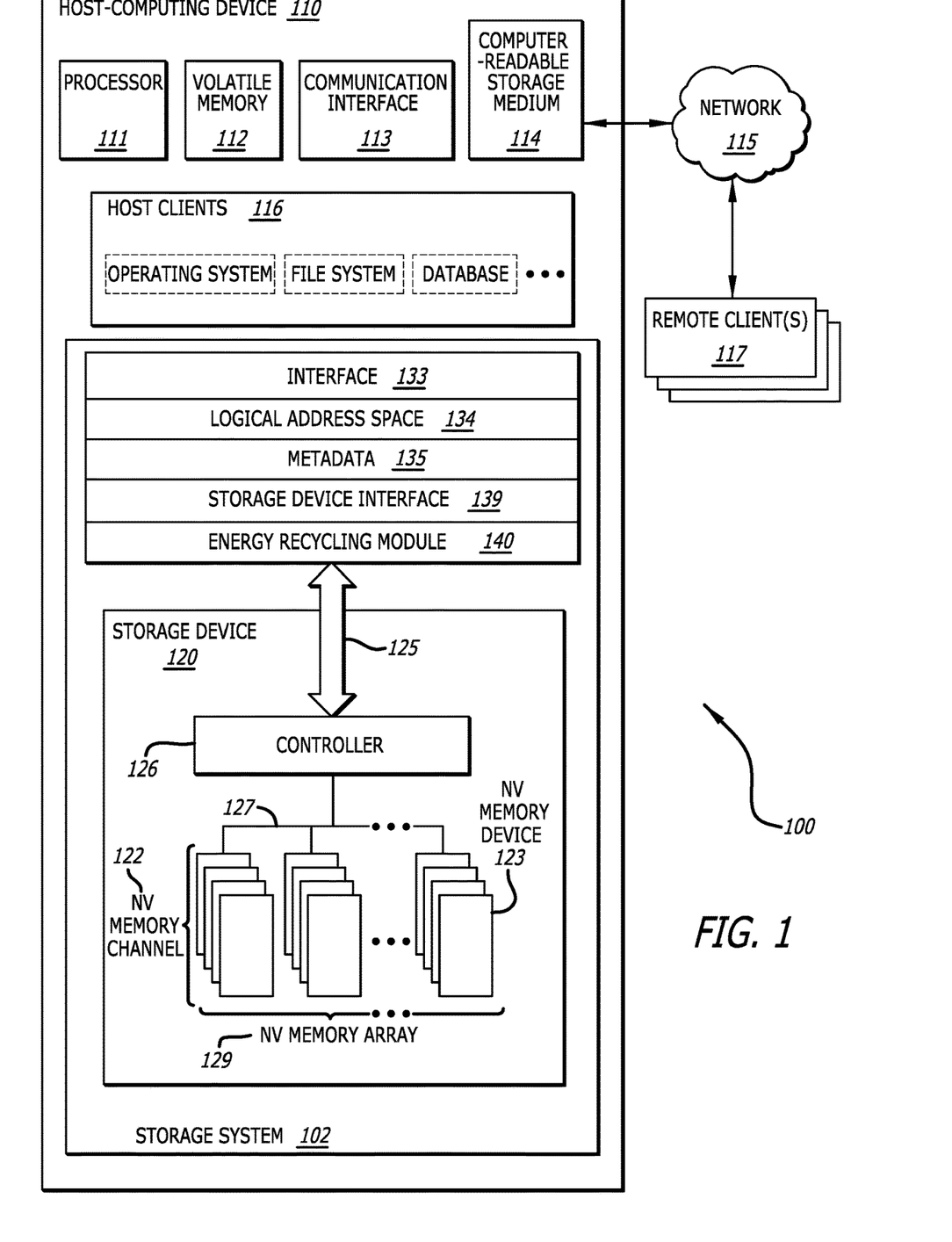
FIG. 1 is a schematic block diagram of a host-computing device with a storage system suitable for translation and data management in accordance with an embodiment of the disclosure.

Referring to FIG. 1, a schematic block diagram of a host-computing device 110 with a storage system suitable for control table set determination in accordance with an embodiment of the disclosure is shown. The control table set determination system 100 may comprise one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

The storage system 102 may also include an energy recycling module 140. In various embodiments, the energy recycling module 140 may be disposed within a storage system, such as the embodiment depicted in FIG. 1. However, it is contemplated that many embodiments comprise at least one energy recycling module 140 disposed within the storage device 120 itself. As described in further detail below, the energy recycling module can be configured to capture excess heat and generate electricity that can be stored or utilized to power other components within the storage device 120 and/or storage system 102. The energy recycling module 140 may also be configured to operate in a cooling mode that can receive a power supply and cool one or more surfaces of various components within the storage device 120 or storage system 102. It should also be noted that the energy recycling module 140 may be similar to the energy recycling modules discussed throughout this disclosure such as those described in FIGS. 2-10.

Figure 2:
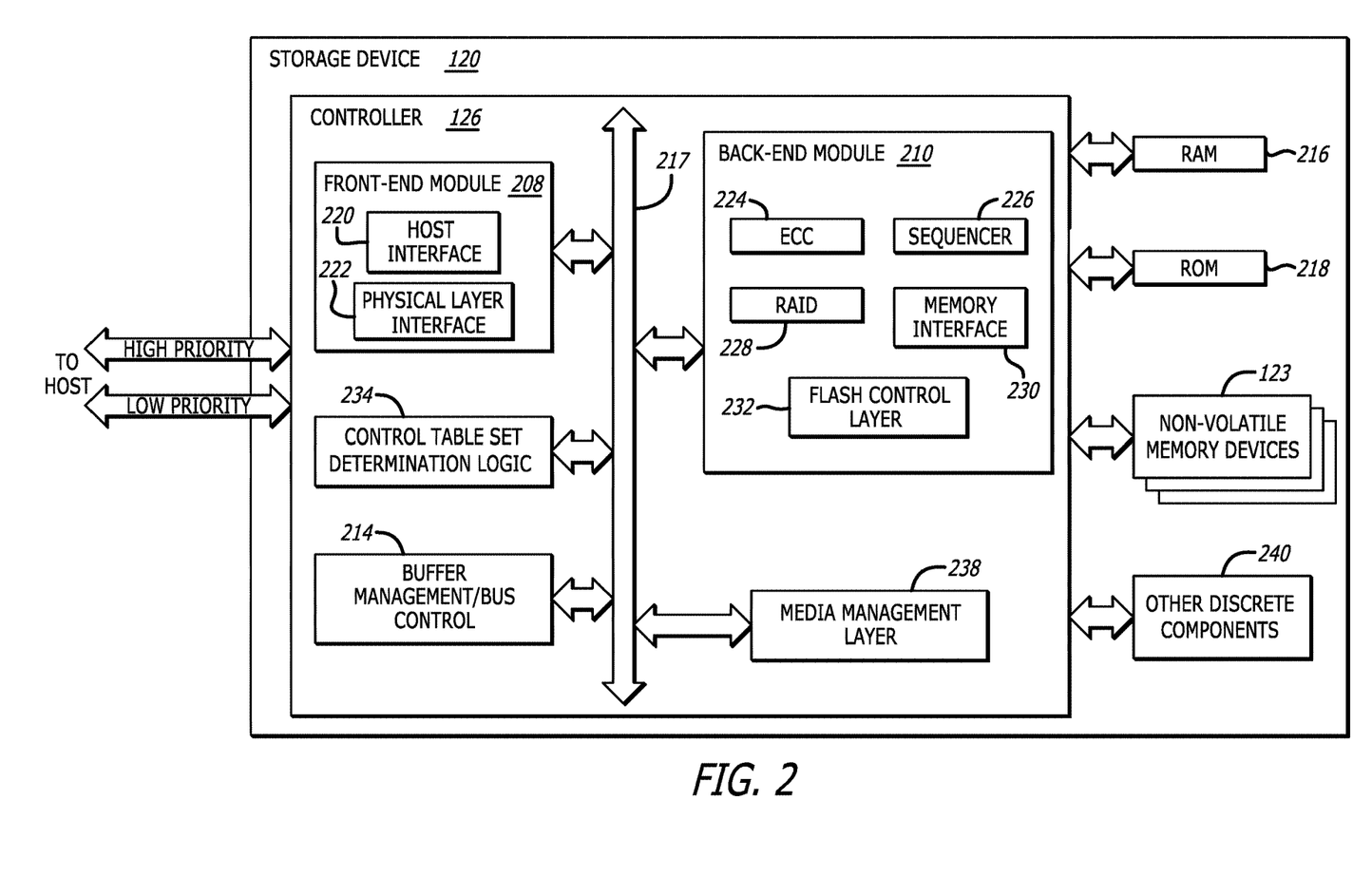
FIG. 2 is a schematic block diagram of a storage device suitable for translation and data management in accordance with an embodiment of the disclosure.

Referring to FIG. 2, a schematic block diagram of a storage device 120 suitable for control table set determination in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Example types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as energy recycling modules, external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a control table set determination logic 234. In many embodiments, the control table set determination logic 234 can be configured to monitor the state of control table sets within the storage device 120. For example, the control table set determination logic 234 may configure and operate the control table cache and/or the control table change lists. The control table set determination logic 234 can direct which control table sets should be transferred into and out of the control table cache. Likewise, the control table change lists can be allocated, managed, and deleted by the control table set determination logic 234.

Figures 3, 4:
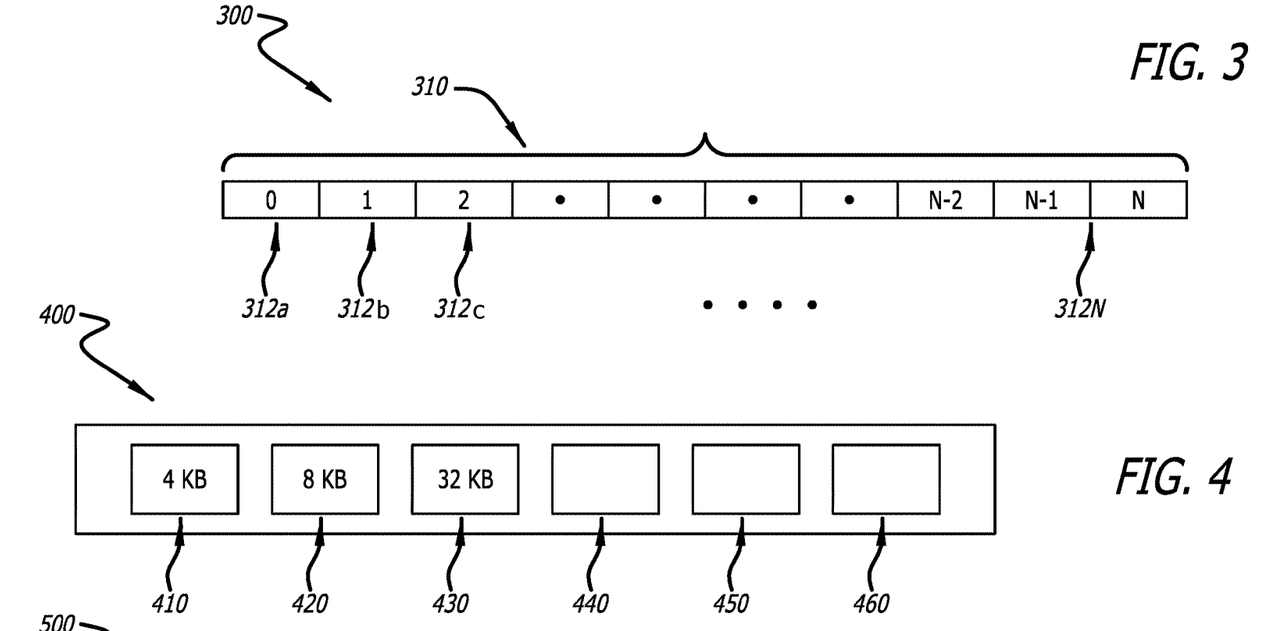
FIG. 3 is a conceptual illustration of a control table set in accordance with an embodiment of the disclosure.
FIG. 4 a conceptual illustration of updating a control table set utilizing a fixed-position method in accordance with an embodiment of the disclosure.

Referring to FIG. 3, a conceptual illustration of a control table set 300 in the translation and data management system in accordance with an embodiment of the disclosure is shown. Typically, a control table set 300 can include a set of control table data entries 310 including data entries 0 to N 312*a*, 312*b*, . . . , 312N. Each control table data entry 312*a*, 312*b*, . . . , 312N can store a particular set of logical to physical address map updates. In the control table set 300 shown in FIG. 3, the control table set 300 includes N+1 control table data entries 0-N. In an embodiment, upon receiving a new set of logical to physical address map updates (hereinafter "entry") a new control data table entry can be added to the end of the control table set 300, at which the new entry can be stored. Once a search command is received from the host computer, e.g., a read or write command, the control table set 300 can be searched, i.e., scanned, from the first end, i.e., control table data entry 312*a*, to the last end, i.e., control table data set 312N. While, the search operation can be performed sequentially, a person skilled in the art will understand that a binary search operation can also be performed to find the desired entry. In an embodiment, even if the desired entry is found, the search operation can continue to the last end to find the most recent occurrence of the desired entry.

Currently, most read/write operations, e.g., translation operations, are performed based on a fixed order scheme which may not provide the benefit in all the cases/workloads and also the volatile memory, e.g., the SRAM, may not have the enough data to perform the translations. To tackle this issue, the translation and data management system can include several main features/steps. Such features/steps can include (i) dynamic data management for an upload layer to determine how much data should be stored in the upload layer of the storage device and when the data is evicted based on the workload range and fragmentation of the storage device; (ii) determining the read-write operations, e.g., translation operations order, to reduce latencies based on determining when the data should be translated from storage portions of the host device and when the data should be translated from the upload layer of the storage device, if the data is residing at both the places based on a state of the storage device; and (iii) updating the stale storage portions of the host device whenever there is an opportunity, e.g., CPU is idle or there is less traffic on bus, to reduce the upload layer search overheads.

Referring to FIG. 4, a conceptual illustration of a control table set 400 in a fragmented upload layer of the storage device, in accordance with an embodiment of the disclosure is shown. In various embodiments, the amount of data that should be translated can impact several operational features of the storage device, such as the consolidation time and subsequent reads translation time when these are translated via the upload layer of the storage device. In some embodiments, the translation and data management system can use the average search time and the average consolidation time to determine the amount of data which can reside in the upload layer of the storage device. Further, the translation and data management system can determine the average search time based on the number of entries for the given range and determine the average consolidation time based on the amount of data for a set of control table sets. This can result in a determination to keep the entries based on a balanced threshold in both cases. In the control table set as shown in FIG. 4, the control table set 400 includes a fragmented upload layer, which indicates that the upload layer includes particular positions to store the entries 410, 420, 430, 440, 450, 460 which are typically significantly smaller size compared to a non-fragmented upload layer. As a non-limiting example, the fragmented upload layer may include entries with the sizes 4 KB, 8 KB, 32 KB, etc. In such fragmented range upload layers, the search time is usually high.

Figure 5:
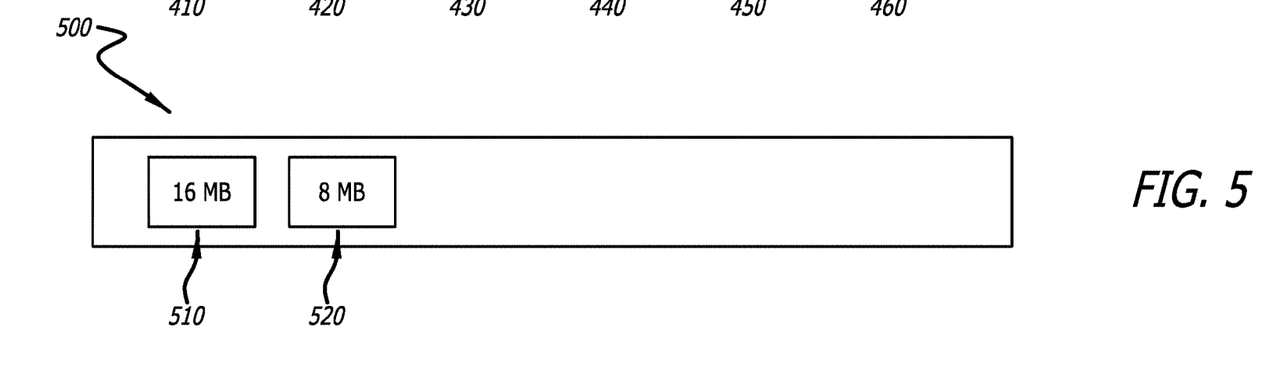
FIG. 5 is a flowchart depicting a process for determining a fixed position for an entry in a control table set in accordance with an embodiment of the disclosure.

Referring to FIG. 5, a conceptual illustration of a control table set 500 in a non-fragmented upload layer of the storage device, in accordance with an embodiment of the disclosure is shown. In control table set 500 as shown in FIG. 5, the control table set 500 includes a non-fragmented upload layer, with entries 510 and 520 that are considerably larger in size than the fragmented upload layer as shown in FIG. 4. As a non-limiting example, the non-fragmented upload layer 500 may include entries with the sizes 16 MB, 8 MB, etc. In such non-fragmented upload layers, the search time is usually low, while the consolidation time is high.

In some embodiments, the translation and data management system can reduce latencies. The translation and data management system can determine whether the translation needs to be done using the upload layer of the storage device or the storage portions of the host device. The translation and data management system can make such determination based on the number of entries, so that if the number of entries exceeds a threshold, then the translation and data management system performs the translations from the storage portions o the host device. Otherwise, if the number of entries does not exceed the threshold, then the translation and data management system performs the translations from the upload layer of the storage device.

In other words, if the data was written sequentially, then the translation and data management system performs the translations in the storage portions of the host device. Alternatively, if the data is written randomly, then the translation and data management system performs the translations in the upload layer of the storage device. In several embodiments, the translation and data management system can make a decision based on the state of the upload layer of the storage device and once the entries are stored based on exceeding the threshold as discussed above. Thus, in case of the fragmented upload layer, the translation and data management system can perform the translation operation in the storage portion of the host device. Alternatively, in case of the non-fragmented upload layer, the translation and data management system can perform the translation operation in the upload layer of the storage device.

In some embodiments, the storage portions of the host device do not include the latest version of an entry, and the latest version of the is only stored in the upload layer of the storage device. In such embodiments, the translation and data management system can update/sync the storage portions of the host device by copying the latest version of entries from the upload layer of the storage device whenever there is an opportunity. As a non-limiting example, the translation and data management system can sync the storage portions of the host device when less intense workloads occurs such as when CPU's usage is below a certain threshold, or the CPU is idle. The translation and data management system can store copies of the lates versions of entries in the storage portions of the host device subsequently. Subsequent translation operations can be performed in the storage portions f the host device which has lower search time compared to the upload layer of the storage device.

Figure 6:
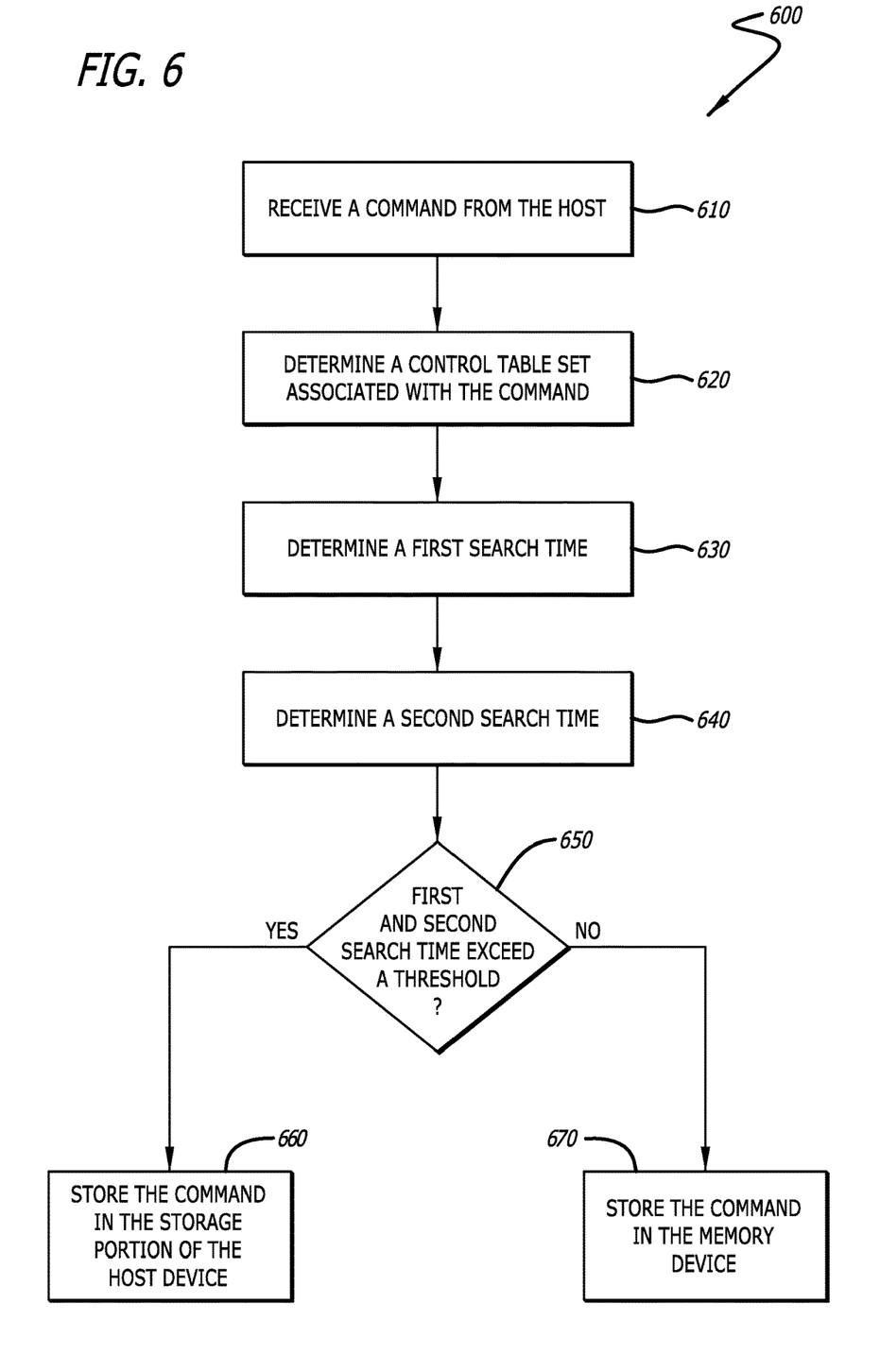
FIG. 6 is a flowchart depicting a process for determining control table sets using a mapping function in accordance with an embodiment of the disclosure.

Referring to FIG. 6 now, a flowchart depicting a process 600 for performing a write or relocation command in accordance with an embodiment of the disclosure is shown. In many embodiments, the process 600 can start at block 610 where the process 600 receives a command from a host device. The received command can be a write command or a relocation command. The received command can be associated with logical to physical address mapping updates.

In an embodiment, the process 600 can determine a control table set among a plurality of control table sets which is associated with the received command, as shown in block 620. In some embodiments, the process 600 can determine a first search time based on a number of data entries for a range of data associated with the determined control table set, as shown by block 630. In some embodiments, the process 600 can determine a second search time based on an amount of data entries in each of the plurality of control table sets, as shown by block 640.

In additional embodiments, the process 600 can determine whether the first and second search times exceed a threshold, as shown by block 650. Upon a determination that the first and second search times do not exceed the threshold, the process 600 stores the received command in the upload layer of the storage device, as shown by block 660. Alternatively, upon a determination that the first and second search times exceed the threshold, the process 600 stores the received command in the storage portions of the host device, i.e., a cached memory, as shown by block 670.

Figure 7:
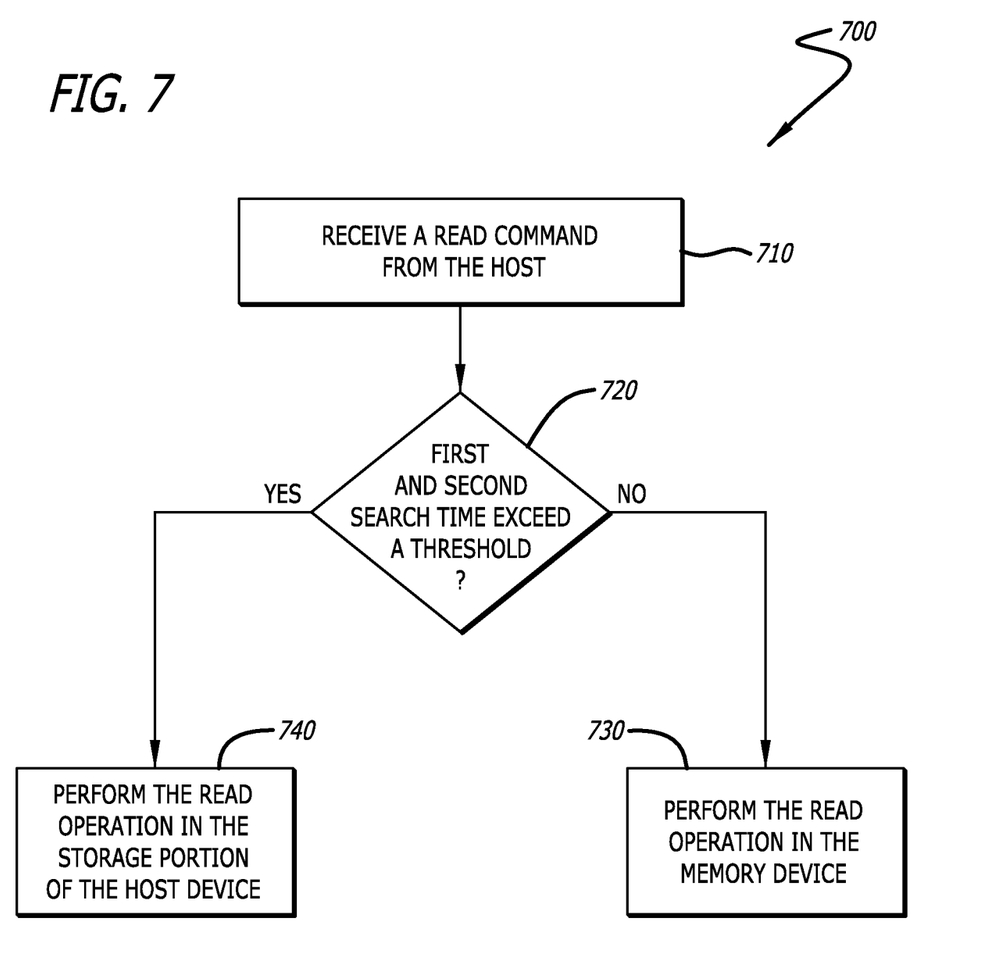
FIG. 7 is a flowchart depicting a process for performing a read operation in a plurality of control table sets in accordance with an embodiment of the disclosure.

Referring to FIG. 7, a flowchart depicting a process 700 for performing a read command in accordance with an embodiment of the disclosure is shown. The process 700 can begin at block 710 where the process 700 receive a read command. The received read command can be associated with logical to physical address mapping updates.

In an embodiment, the process 700 can determine the first search time based on the number of data entries for a range of data associated with the control table set associated with the read command, and the second search time based on the amount of data entries in each of the plurality of control table sets. The process 700 can then determine whether the first and second search times exceed a threshold, as shown by block 720. Upon a determination that the first and second search times do not exceed the threshold, the process 700 performs the read operation in the upload layer of the storage device, as shown by block 730. Alternatively, upon a determination that the first and second search times exceed the threshold, the process 700 performs the read operation in the storage portions of the host device, i.e., the cached memory, as shown by block 740.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A storage device, including:
   a processor;
   a memory array comprising a plurality of memory devices, wherein the plurality of memory devices is configured to store a plurality of control table sets; and
   a control table set management logic configured to:
   receive a first command from a host device, wherein the first command is associated with logical to physical address mapping updates, wherein the first command is at least one of a write command and a relocation command;
   determine a control table set of the plurality of control table sets associated with the first command;
   determine a first search time based on a number of data entries for a range of data associated with the determined control table set of the plurality of control table sets;
   determine a second search time based on an amount of data entries in each of the control table sets of the plurality of control table sets;
   upon a first determination that the first and second search time does not exceed a first and second threshold, respectively, store the first command in the plurality of memory devices; and
   upon a second determination that the first and second search time exceeds the first and second threshold, respectively, store the first command in a storage portion of the host device.

2. The storage device of claim 1, wherein the storage portion of the host device is a cache memory.

3. The storage device of claim 2, wherein the cache memory of the host device is accessible by the storage device.

4. The storage device of claim 1, wherein the storage device can access the cache memory via a PCIe interface.

5. The storage device of claim 1, wherein the control table set management logic is configured to:
   receive a second command from the host device, wherein the second command is associated with the logical to physical address mapping updates, wherein the second command is a read command; and
   upon a third determination that the first and second search time does not exceed the first and second threshold, respectively, perform a read operation in the plurality of memory devices.

6. The storage device of claim 5, wherein the control table set management logic is configured to:
   upon a fourth determination that the first and second search time exceeds the first and second threshold, respectively, perform the read operation in the storage portion of the host device.

7. The storage device of claim 1, wherein the plurality of memory devices includes non-volatile memory devices.

8. The storage device of claim 7, wherein the non-volatile memory devices include NAND devices.

9. The storage device of claim 5, wherein the control table set management logic is configured to:
   perform the read operation in the plurality of memory devices if the first command is written sequentially.

10. The storage device of claim 6, wherein the control table set management logic is configured to:
    perform the read operation in the storage portion of the host device if the first command is written randomly.

11. The storage device of claim 1, wherein the control table set management logic is configured to:
    update the storage portion of the host device by storing missing copies of received commands into the storage portion.

12. The storage device of claim 11, wherein the control table set management logic updates the storage portion of the host device when a host device processor is idle.

13. The storage device of claim 11, wherein the control table set management logic is configured to:
    receive a third command from the host device, wherein the third command is a read command; and
    perform a read operation in the storage portion of the host device.

14. The storage device of claim 1, wherein each of the plurality of control table sets is configured to store a distinct range of logical to physical address mapping data entries.

15. A method for decreasing latency in a memory device, the method comprising:
    receiving a first command from a host device, wherein the first command is associated with logical to physical address mapping updates, wherein the first command is at least one of a write command and a relocation command;
    determining a control table set among a plurality of control table sets associated with the first command;
    determining a search time based on a number of data entries for a range of data associated with the determined control table set, and an amount of data entries in each of the plurality of control table sets;

upon a first determination that the search time does not exceed a threshold, storing the first command in the memory device;
upon a second determination that the search time exceeds the threshold, accessing a cache memory of the host device; and
storing the first command in the accessed cache memory.

16. The method of claim 15, further comprising:
receiving a second command from the host device, wherein the second command is associated with the logical to physical address mapping updates, wherein the second command is a read command;
upon a third determination that the search time does not exceed the threshold, performing a read operation in the memory device.

17. The method of claim 16, further comprising:
upon a fourth determination that the search time exceeds the threshold, performing the read operation in the cache memory of the host device.

18. The method of claim 15, further comprising:
performing the read operation in the memory device if the first command is written sequentially; and
performing the read operation in the storage portion of the host device if the first command is written randomly.

19. The method of claim 15, further comprising:
updating the cache memory of the host device by storing missing copies of received commands into the cache memory.

20. A non-transitory machine-readable medium having instructions stored therein, which when executed by a processor, direct the processor to perform operations comprising:
receiving a first command from a host device, wherein the first command is associated with logical to physical address mapping updates, wherein the first command is at least one of a write command and a relocation command;
determining a control table set among a plurality of control table sets associated with the first command;
determining a search time based on a number of data entries for a range of data associated with the determined control table set, and an amount of data entries in each of the plurality of control table sets;
upon a first determination that the search time does not exceed a threshold, storing the first command in the memory device;
upon a second determination that the search time exceeds the threshold, accessing a cache memory of the host device;
storing the first command in the accessed cache memory;
receiving a read command from the host device;
upon a third determination that the search time does not exceed the threshold, performing a read operation in the memory device; and
upon a fourth determination that the search time exceeds the threshold, performing the read operation in the cache memory of the host device.

* * * * *